(12) United States Patent
Intil (10) Patent No.: US 11,589,709 B1
(45) Date of Patent: Feb. 28, 2023

(54) DEVICE TO ENHANCE COOKING

(71) Applicant: Anthony Intil, Merced, CA (US)

(72) Inventor: Anthony Intil, Merced, CA (US)

(*) Notice: Subject to any disclaimer, the term of this patent is extended or adjusted under 35 U.S.C. 154(b) by 260 days.

(21) Appl. No.: 17/107,279

(22) Filed: Nov. 30, 2020

(51) Int. Cl.
*A47J 37/07* (2006.01)
*A47J 43/00* (2006.01)

(52) U.S. Cl.
CPC ......... *A47J 37/0786* (2013.01); *A47J 43/00* (2013.01); *A47J 2202/00* (2013.01)

(58) Field of Classification Search
CPC ..... A37J 37/0786; A37J 43/00; A37J 2202/00
See application file for complete search history.

(56) References Cited

U.S. PATENT DOCUMENTS

| | | | | |
|---|---|---|---|---|
| 1,485,253 A * | 2/1924 | Devlin | A47J 37/00 | 165/47 |
| 2,404,166 A * | 7/1946 | Danilla | A47J 37/00 | 165/47 |
| 2,835,480 A * | 5/1958 | Perez | A47J 37/04 | 366/252 |
| 3,584,683 A * | 6/1971 | Gordon | A47J 37/00 | 165/185 |
| 3,709,141 A * | 1/1973 | Schwartzstein | A47J 37/04 | 165/185 |
| 3,899,657 A * | 8/1975 | Johnson | A47J 37/06 | 219/202 |
| 4,127,060 A * | 11/1978 | Curtis | A47J 37/00 | D7/323 |
| 4,194,015 A * | 3/1980 | Colato | A23L 3/36 | 426/514 |
| 4,381,439 A * | 4/1983 | Miyazawa | G01K 7/32 | 374/E1.004 |
| 5,586,489 A * | 12/1996 | Fraga | A47J 37/049 | 99/421 H |
| 5,981,908 A * | 11/1999 | McGuire | A45D 4/16 | 132/229 |
| 6,265,004 B1 * | 7/2001 | Cagle | A22C 21/00 | 99/428 |
| 6,416,804 B1 * | 7/2002 | Sherwin | A47J 43/18 | 426/282 |
| 6,725,764 B2 * | 4/2004 | Sherwin | A47J 43/18 | 99/426 |
| 7,131,906 B1 * | 11/2006 | Aquilante | A23L 13/57 | 452/198 |
| D548,003 S * | 8/2007 | Barth | A47J 43/18 | D7/387 |
| 7,320,275 B2 * | 1/2008 | Jenkins | A23B 4/32 | 99/345 |
| D591,105 S * | 4/2009 | Hodges | D7/409 | |
| 8,137,732 B2 * | 3/2012 | Groll | A23L 5/15 | 426/523 |
| 10,674,864 B2 * | 6/2020 | Trtic | A47J 31/54 | |
| 2003/0019862 A1 * | 1/2003 | Sherwin | A47J 36/00 | 219/400 |

(Continued)

*Primary Examiner* — Kevin R Kruer (57) ABSTRACT

Methods and devices to enhance cooking are described. A device to enhance cooking includes a shaft. The shaft has one end that is adapted to be outside an object and a second end to be inserted into the object. The shaft includes at least one opening that is coupled to the second end. The at least one opening of the shaft is configured to output at least a portion of the heat that travels through the first end of the shaft into the object to reduce a cooking time of the object.

18 Claims, 6 Drawing Sheets

(56) References Cited

U.S. PATENT DOCUMENTS

| | | | |
|---|---|---|---|
| 2004/0142082 A1* | 7/2004 | Friedl | F24C 14/005 |
| | | | 426/523 |
| 2004/0250691 A1* | 12/2004 | Schmanski | A47J 37/0864 |
| | | | 99/419 |
| 2008/0044536 A1* | 2/2008 | Barth | A47J 43/18 |
| | | | 426/523 |
| 2020/0096393 A1* | 3/2020 | Lion | G01K 1/12 |
| 2020/0100614 A1* | 4/2020 | Yao | A47J 36/321 |
| 2020/0129006 A1* | 4/2020 | Nivala | A47J 37/0786 |
| 2022/0175188 A1* | 6/2022 | Lev | A47J 37/0688 |

* cited by examiner

DEVICE TO ENHANCE COOKING

FIELD

Embodiments of the present application pertain to a technological area of food preparation, and in particular, to devices and methods to enhance cooking.

DESCRIPTION OF RELATED ART

Many cooking techniques, for example, grilling, baking, roasting, boiling, frying, steaming, smoking, and microwaving use heat to prepare food for consumption. The food is cooked, as the heat from a heat source, such as an open flame, or an oven gradually travels from the surface to the center of the food. The different cooking techniques may vary in levels of heat and cooking time.

Generally, the extent to which meat is cooked correlates with the internal temperature of the meat. The internal temperature indicates when the meat is cooked as desired. Typically, meat is considered to be cooked when the internal temperature of the meat reaches a predetermined temperature. For example, the predetermined temperature of the meat may be the temperature that is sufficient to kill pathogens that may cause foodborne illness.

Typically, a meat thermometer is used to measure the internal temperature of meat. A conventional meat thermometer has a probe with a sharp point which is pushed into the meat, and a display to display the measured internal temperature.

Typically, a meat baster is used to keep meat moist during the cooking process and to apply flavor. A conventional meat baster has a tube attached to a rubber bulb to suck up juices from a pan to pour over meat.

The conventional meat thermometer and the conventional meat baster, however, cannot decrease the cooking time of the meat.

SUMMARY

Embodiments of the application include methods and devices to enhance cooking. A device to enhance cooking includes a shaft. The shaft has one end that is adapted to be outside an object and a second end to be inserted into the object. The shaft includes at least one opening that is coupled to the second end. The at least one opening of the shaft is configured to output at least a portion of the heat that travels through the first end of the shaft into the object to reduce a cooking time of the object.

Other features of the application will be apparent from the accompanying drawings and from the detailed description which follows.

BRIEF DESCRIPTION OF THE DRAWINGS

The appended drawings illustrate examples and are, therefore, exemplary embodiments and not considered to be limiting in scope.

DETAILED DESCRIPTION

Methods and apparatuses to enhance cooking are described. In at least one embodiment, a device to enhance cooking includes a shaft. The shaft has one end that is adapted to be outside an object and a second end to be inserted into the object. The shaft includes at least one opening that is coupled to the second end. The at least one opening of the shaft is used to output at least a portion of the heat that travels through the first end of the shaft into the object, so that a cooking time of the object is significantly reduced comparing with conventional cooking techniques.

In the following description, numerous specific details, such as specific materials, chemistries, dimensions of the elements, etc. are set forth in order to provide thorough understanding of one or more of the embodiments of the application. It will be apparent, however, to one of ordinary skill in the art that the one or more embodiments of the application may be practiced without these specific details. In other instances, the fabrication processes, techniques, materials, equipment, etc., have not been described in great details to avoid unnecessarily obscuring of this description. Those of ordinary skill in the art, with the included description, will be able to implement appropriate functionality without undue experimentation.

While certain exemplary embodiments of the application are described and shown in the accompanying drawings, it is to be understood that such embodiments are merely illustrative and not restrictive of the current application, and that this application is not restricted to the specific constructions and arrangements shown and described because modifications may occur to those ordinarily skilled in the art.

Reference throughout the specification to "one embodiment", "another embodiment", or "an embodiment" means that a particular feature, structure, or characteristic described in connection with the embodiment is included in at least one embodiment of the application. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all the features of a single disclosed embodiment. Thus, the claims following the Detailed Description are hereby expressly incorporated into this Detailed Description, with each claim standing on its own as a separate embodiment of this application. While the application has been described in terms of several embodiments, those skilled in the art will recognize that the application is not limited to the embodiments described, but can be practiced with modification and alteration within the spirit and scope of the appended claims. The description is thus to be regarded as illustrative rather than limiting.

Figure 1:
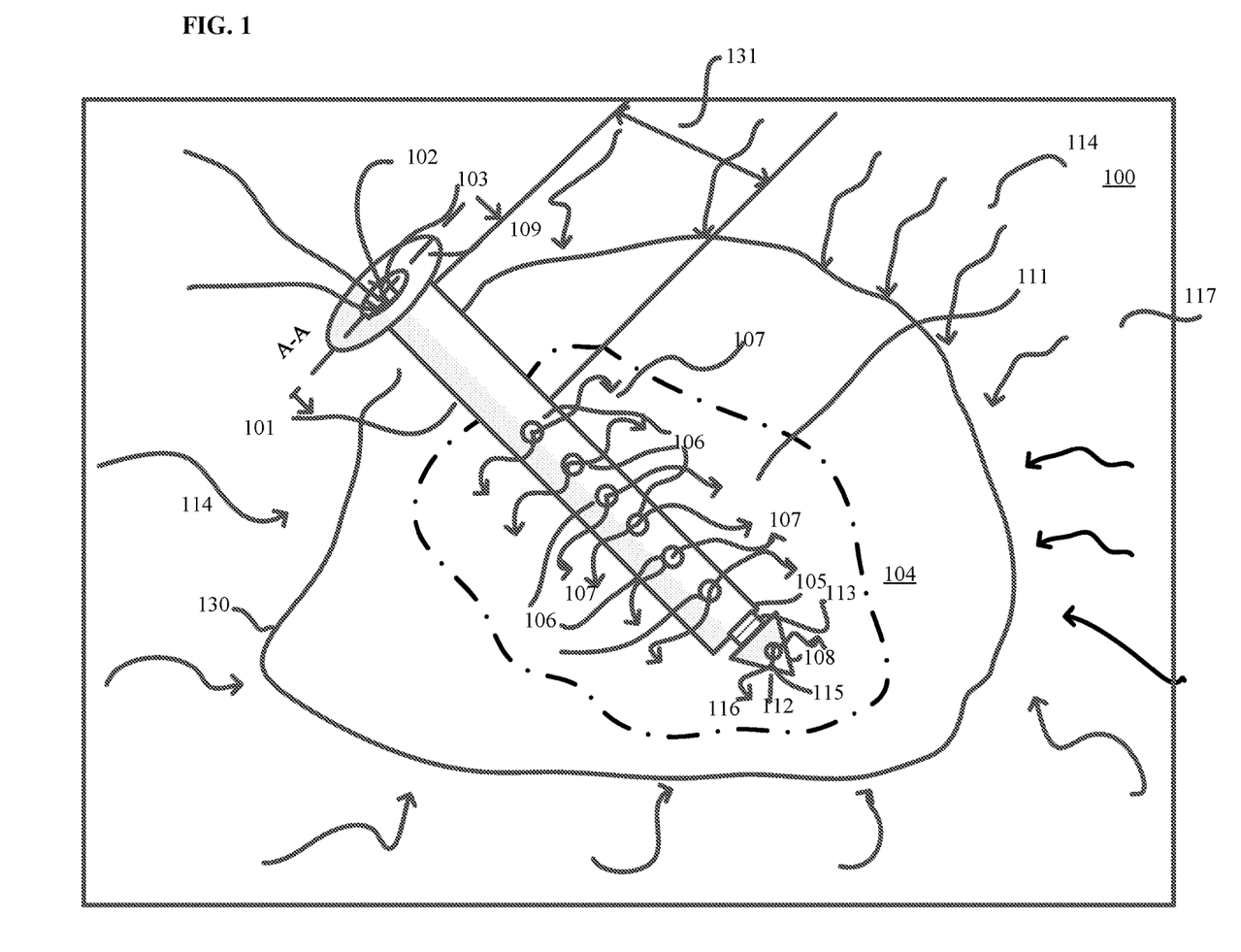
FIG. 1 is a view of a device to enhance cooking according to one embodiment.

FIG. 1 is a view 100 of a device to enhance cooking according to one embodiment. As shown in FIG. 1, the device to enhance cooking comprises a shaft 101. The shaft 101 has an end 103 and an end 105. In at least some embodiments, the shaft 101 is a thermoconductive shaft. In at least some embodiments, a material of the shaft 101 has a thermal conductivity that is at least 50 Watts per meter per degree Kelvin (W/m×K) and is food safe. In at least some embodiments, a material of the shaft 101 has a thermal conductivity that is greater than or similar to that of copper. In alternative embodiments, examples of the thermoconductive materials that may be used for the shaft are, but not limited to, metals, e.g., copper, silver, gold, aluminum, tungsten, titanium, zinc, metal alloys, carbon based materials, e.g., silicon carbide, diamond, ceramics, e.g. aluminum nitride, polymers, or any combination thereof and are food safe. In at least some embodiments, the shaft is a copper shaft. In at least some embodiments, the shaft is a hollow shaft. In at least some embodiments, the shaft is a tube. In at least some embodiments, the shaft has a cylindrical shape, a rectangular shape, a zigzag shape, a wave shape, or other shape.

The end 105 is inserted into an object 104. The end 103 is in an outside space 114 of the object 104. In one embodiment, the object 104 is a food, e.g., a meat, a bread, a vegetable, a fruit, or other object that needs to be cooked. The meat may be, for example, beef, pork, poultry, or any other meat. The bread may be, for example, a loaf, a pie, a cake, or any other bread. In an embodiment, the object 104 is placed into a space 117 for cooking. In one embodiment, the space 117 is an enclosed space, e.g., an oven, a roaster, a grill, a pot, a pan, a chamber, a pit, or any other enclosed space for cooking using heat. As shown in FIG. 1, a heat 102 is genera ted in the space 117 to cook the object 104. In at least some embodiments, the heat 102 has a temperature that is greater than a room temperature (e.g., 20 degrees C.). In at least some embodiments, the heat 102 has a temperature that is greater than 25 degrees C. In at least some embodiments, the heat 102 has a temperature that is in an approximate range from about 50 degrees C. to about 300 degrees C., but the temperature is not limited thereto. As the object 104 is cooked, the heat 102 gradually diffuses through a surface 130 of the object 104 to an internal portion of the object 104.

As shown in FIG. 1, the end 103 of the shaft 101 has an opening to receive the heat 102 from the outside 114 of the object 104. In at least some embodiments, the end 105 has an opening to output at least a portion 107 of the heat 102 that travels through the end 103 into a center portion 111 of the object 104. As shown in FIG. 1, the shaft 101 has openings 106 between the end 103 and end 105. In at least some embodiments, the openings in the shaft are holes. As the heat is transmitted directly into the center portion of the object through the one or more openings in the thermoconductive shaft of the device, the object is cooked significantly faster comparing to conventional cooking techniques.

As shown in FIG. 1, the device to enhance cooking includes a removable fixture 108 coupled to the end 105. The removable fixture 108 comprises a tip portion 112 that is inserted into the object 104 and a fitting portion 113 to fit into the end 105. In at least some embodiments, the tip portion 112 has a conic shape with a sharp tip point which is pushed into the object 104, but the shape is not limited thereto. In at least some embodiments, the removable fixture 108 has an opening 115 through which at least a portion 116 of the heat 102 is output into the center portion 111 of the object 104, so that the cooking speed of the object is increased and the cooking time of the object is decreased comparing to conventional techniques.

In at least some embodiments, a material of the removable fixture has a thermal conductivity that is at least 50 Watts per meter per degree Kelvin (W/m×K) and is food safe. In at least some embodiments, a material of the shaft 101 has a thermal conductivity that is greater than or similar to that of copper. In alternative embodiments, examples of the thermoconductive materials that may be used for the shaft are, but not limited to, metals, e.g., copper, silver, gold, aluminum, tungsten, titanium, zinc, metal alloys, carbon based materials, e.g., silicon carbide, diamond, ceramics, e.g. aluminum nitride, polymers, or any combination thereof and are food safe. In at least some embodiment, the material of the removable fixture 108 is similar to that of the shaft 101. The removable fixture 108 can be removed to clean internal walls of the shaft 101 from oils and other residue after cooking.

As shown in FIG. 1, the device to enhance cooking includes a top portion 109 attached to the end 103 to push at least a portion of the shaft 101 into the object 104 and pull at least a portion of the shaft out of the object 104. In at least some embodiments, the top portion 109 is a part of the shaft 101. In at least some embodiments, the top portion 109 is attached to the shaft using an adhesive. The top portion 109 has an opening to receive heat 102. In at least some embodiments, the top portion 109 is a disk shaped.

In at least some embodiments, a material of the top portion 109 has a thermal conductivity that is at least 50 Watts per meter per degree Kelvin (W/m×K) and is food safe. In at least some embodiments, a material of the top portion 109 has a thermal conductivity that is greater than or similar to that of copper. In alternative embodiments, examples of the thermoconductive materials that may be used for the shaft are, but not limited to, metals, e.g., copper, silver, gold, aluminum, tungsten, titanium, zinc, metal alloys, carbon based materials, e.g., silicon carbide, diamond, ceramics, e.g. aluminum nitride, polymers, or any combination thereof and are food safe. In at least some embodiment, the material of the top portion 109 is similar to that of the shaft 101. That is, as the heat is induces directly into the center portion of the object through openings in the shaft and the removable fixture, the object is cooked significantly faster comparing to conventional cooking techniques. In at least some embodiments, the cooking time of the object is reduced by at least 20 percent comparing to conventional cooking techniques. In at least some embodiments, the cooking time of the object is reduced by at least about a factor of two comparing to conventional cooking techniques.

As shown in FIG. 1, a portion 131 of the shaft 101 including top portion 109 sticks out of the object 104, and the rest of the shaft is in the object 104. In at least some embodiments, the cooking speed is controlled by adjusting the length of the portion 131. In at least some embodiments, decreasing the portion 131 that sticks out of the object 104, increases the portion 107 of the heat 102 that is transferred through the openings in the shaft 101 into the object that increases the cooking speed and decreases the cooking time. As shown in FIG. 1, the openings 106 are located along the length of the shaft 101. In at least some embodiments, decreasing the portion 131 that sticks out of the object 104, increases a number of openings 106 through which the heat is transferred into the object, so that the amount of heat 107 that is transferred through the openings into the object increases thereby increasing the cooking speed and decreasing the cooking time. In at least some embodiments, increasing the portion 131 that sticks out of the object 104, decreases a number of openings 106 through which the heat is transferred into the object, so that the amount of heat 107 that is transferred through the openings into the object decreases thereby decreasing the cooking speed and increasing the cooking time.

Figure 3A:
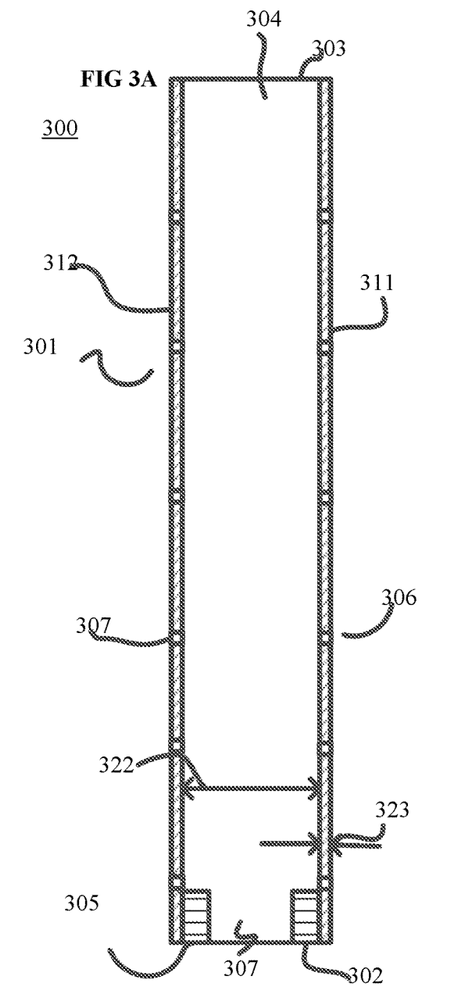
FIG. 3A is a cross-sectional view of a shaft of the device to enhance cooking according to one embodiment.
Figure 3B:
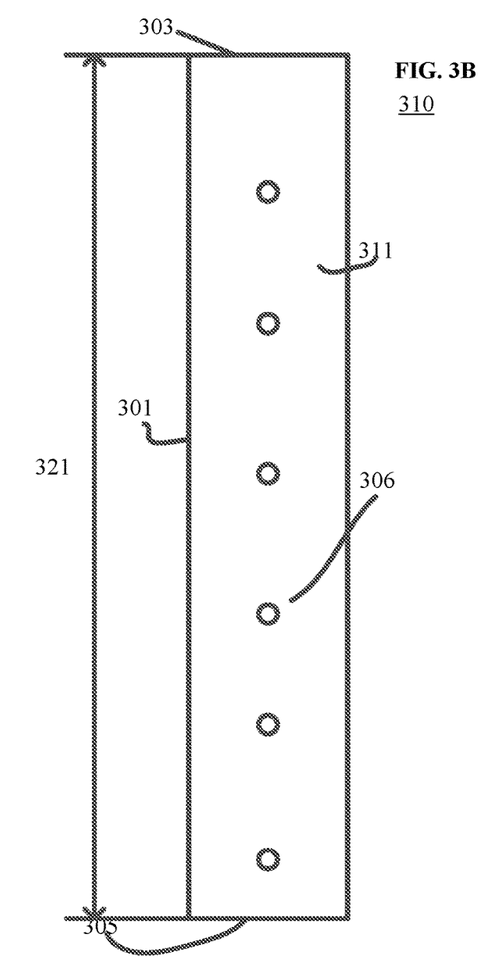
FIG. 3B is a side view of the shaft of the device to enhance cooking according to one embodiment.
Figure 3C:
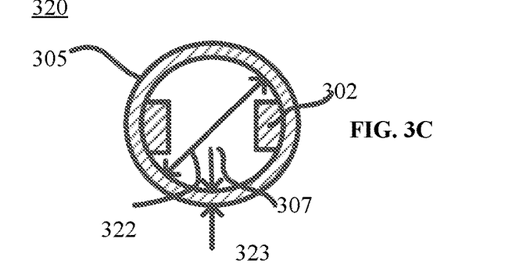
FIG. 3C is an end view of the shaft of the device to enhance cooking according to one embodiment.

FIG. 3A is a cross-sectional view 300 of a shaft 301 of the device to enhance cooking according to one embodiment. In at least some embodiments, the shaft 301 represents the shaft 101 and cross-sectional view 300 is a view of the shaft 101 along a line A-A shown in FIG. 1. FIG. 3B is a side view 310 of the shaft according to one embodiment. FIG. 3C is an end view 320 of the shaft according to one embodiment. As shown in FIGS. 3A, 3B and 3C, the shaft 301 has an end 303 comprising an opening 304 to receive the heat and an end 305 comprising an opening 307 to be inserted to the object, as described above with respect to FIG. 1.

As shown in FIGS. 3A and 3B, the shaft 301 has openings, e.g., an opening 306 and an opening 307 located on a sidewall of the shaft that extends from the end 303 to end 305. As shown in FIG. 3A, a plurality of openings, such as an opening 306 are located on a sidewall 311. A plurality of openings, such as an opening 307 are located on a sidewall 312. In at least some embodiments, the sidewalls 311 and 312 are opposing sidewalls. In at least some embodiments, a distance from the end 303 to opening 306 is about the same as a distance from the end 303 to opening 307. In at least some embodiments, the openings are located on a sidewall of the shaft at about equal distances from one another. In at least some embodiments, the openings are through holes. In at least some embodiments, the shaft 301 has a length 321 that is substantially greater than a width 322. In at least some embodiments, the width 322 of the shaft at the end 303 is greater than the width 322 at the end 305. In at least some other embodiments, the width 322 of the shaft at the end 303 is smaller or similar to the width 322 at the end 305.

In at least some embodiments, the length of the shaft is in an approximate range from about 2 centimeters (cm) to about 20 cm, but the length is not limited thereto. In one embodiment, the length of the shaft is in an approximate range of 7 cm to 16 cm. In at least some embodiments, the width of the shaft is in an approximate range from about 0.2 cm to about 2 cm, but the width is not limited thereto. In one embodiment, the width of the shaft is in an approximate range of 0.5 cm to 1.5 cm. In at least some embodiments, a thickness 323 of the sidewall of the shaft is in an approximate range from about 0.01 cm to about 0.2 cm, but the thickness is not limited thereto.

As shown in FIGS. 3A and 3C, the shaft 301 has a fitting portion 302 attached to the end 305 to receive a fitting portion of the removable fixture. In at least some embodiment, the fitting portion 302 has an internal thread attached to the internal sidewall at the end 305 of the shaft to mate with the fitting portion of the removable fixture.

Figure 4A:
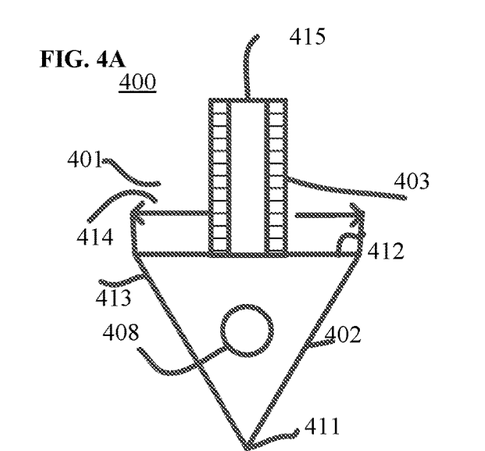
FIG. 4A is a side view of a removable fixture of the device to enhance cooking according to one embodiment.
Figure 4B:
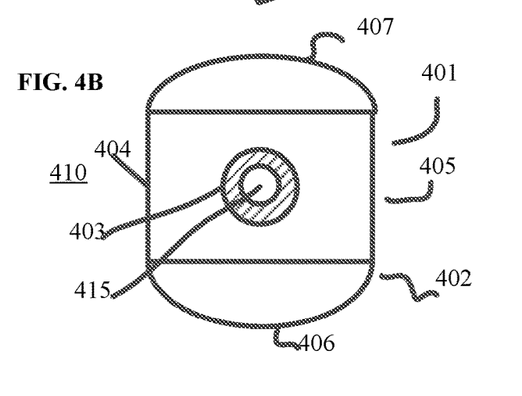
FIG. 4B illustrates a top view of the removable fixture according to one embodiment.

FIG. 4A is a side view 400 of a removable fixture 401 of the device to enhance cooking according to one embodiment. In at least some embodiments, removable fixture 401 represents a removable fixture 108 shown in FIG. 1. FIG. 4B illustrates a top view 410 of the removable fixture according to one embodiment. As shown in FIGS. 4A and 4B, a removable fixture 401 includes a tip portion 402 to be inserted into the object and a fitting portion 403 to fit into the fitting portion of the shaft. In at least one embodiment, the fitting portion 403 has a screw thread to fasten to the internal thread of the fitting portion of the shaft. In at least some embodiments, the fitting portion 403 has an opening 415 to provide a path for the heat 202 to escape through the end 305 of the shaft and one or more openings in the tip portion into the center portion of the object.

As shown in FIGS. 4A and 4B, the tip portion 408 includes one or more openings, such as an opening 408 through which at least a portion of the heat escapes into the object, as described above. In at least some embodiments, the tip portion has a conic shape with a sharp tip point which is pushed into the object. As shown in FIGS. 4A and 4B, the tip portion 402 has a sidewall 413 extending from a tip point 411 to a base 412. In at least some embodiments, a portion of the sidewall 413 is shaved to provide a firm grip for a user when the removable fixture needs to be removed from or attached to the shaft. As shown in FIGS. 4A and 4B, the sidewall 413 has a shaved portion 404 and a shaved portion 405 that are substantially flat. The sidewall 413 has unshaved portions 407 and 406 that are substantially round.

In at least some embodiments, a size 414 of the base 412 is in an approximate range from about 0.5 cm to about 2 cm, but the size is not limited thereto. In at least some embodiments, the length of the sidewall 413 is in an approximate range from about 0.5 cm to about 2 cm, but the length is not limited thereto.

Figure 5:
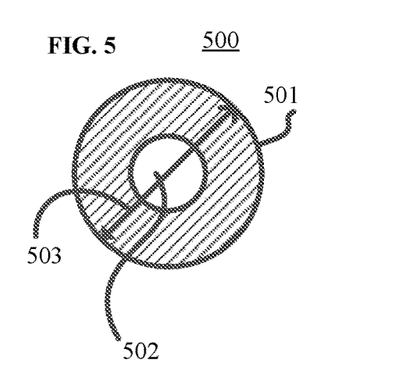
FIG. 5 is a top view of a top portion of the device to enhance cooking according to one embodiment.

FIG. 5 is a top view 500 of a top portion 501 of the device to enhance cooking according to one embodiment. In at least some embodiments, a top portion 501 represents the top portion 109 shown in FIG. 1. As shown in FIG. 5, the top portion 501 has an opening 502 to receive the heat and pass the heat through at least one of the openings of the shaft into the object, as described above. In at least some embodiments, a size of the top portion 501 is in the approximate range from about 0.5 cm to about 2 cm, but the size is not limited thereto. In at least some embodiment, the size of the opening 502 is in an approximate range from about 0.2 cm to about 1.5 cm, but the size is not limited thereto. In at least some embodiment, the size of the opening 502 is similar to that of the width of the shaft.

Figure 2:
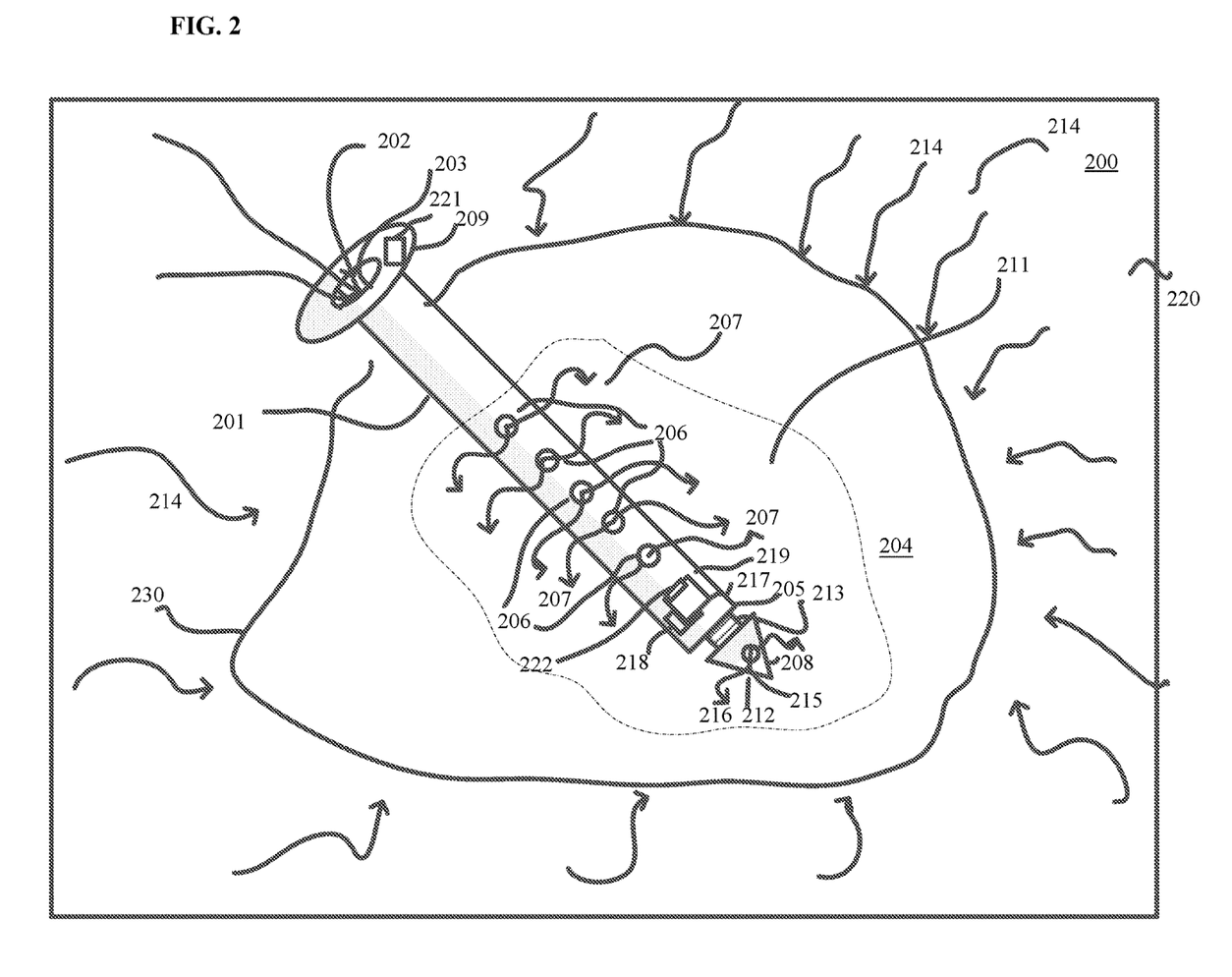
FIG. 2 is a view of a device to enhance cooking according to another embodiment.

FIG. 2 is a view 200 of a device to enhance cooking according to another embodiment. As shown in FIG. 2, the device to enhance cooking comprises a shaft 201. The shaft 201 has an end 203 and an end 205. In at least some embodiments, the shaft 201 is a thermoconductive shaft, as described above with respect to FIGS. 1, 3A-3C. In at least some embodiments, the shaft is a hollow shaft. In at least some embodiments, the shaft is a tube. In at least some embodiments, the shaft has a cylindrical shape, a rectangular shape, a zigzag shape, a wave shape, or other shape.

The end 205 is inserted into an object 204. The end 203 is in an outside 214 of the object 204. In one embodiment, the object 204 is a food, e.g., a meat, a bread, a vegetable, a fruit, or other object that needs to be cooked, as described above. In an embodiment, the object 204 is placed into a space 220 for cooking. In one embodiment, the space 220 is an enclosed space, as described above with respect to FIG. 1. A heat 202 is generated in the space 220 to cook the object 204. In at least some embodiments, the heat 202 has a temperature that is greater than a room temperature, as described above. As the object 204 is cooked, the heat 202 from the outside 214 gradually diffuses through a surface 230 of the object 204 to an internal portion of the object 204. As shown in FIG. 2, the end 203 of the shaft 201 has an opening to receive the heat 202 from the outside 214 of the object 204. In at least some embodiments, the end 205 has an opening to output at least a portion 207 of the heat 202 that travels through the end 203 into a center portion 211 of the object 204. As shown in FIG. 2, the shaft 201 has openings 206 between the end 203 and end 205. As at least a portion 207 of the heat 202 is transmitted directly to the center portion 211 of the object through openings 206 in the thermoconductive shaft 201, the cooking time of the object is significantly reduced comparing to conventional cooking techniques. In at least some embodiments, the openings are through holes.

As shown in FIG. 2, the device to enhance cooking includes a vacuum chamber 217 coupled to the shaft 201. The vacuum chamber 217 is located between end 203 and end 205 of the shaft 201. In at least some embodiments, vacuum chamber 217 is a liquid proof sealed enclosure from which air and other gases are removed by a vacuum pump, so that a pressure in the vacuum chamber is lower than an atmospheric pressure outside the vacuum chamber. As shown in FIG. 2, the vacuum chamber 217 is located at the end 205 of the shaft 201 and is attached to the shaft 201 via a seal (not shown). The seal may include an elastomer, or other vacuum seal. As shown in FIG. 2, the vacuum chamber 217 has a window 222 for the heat path through the shaft 201. In at least some embodiments, when the window 222 is opened, the lower pressure in the vacuum chamber 217 creates suction that increases the flow of the heat 202 that travels through the shaft towards the center portion 211 of the object 204. In at least some embodiments, when the window 222 is closed, the vacuum chamber 217 does not provide suction, so that the flow of the heat 202 that travels through the shaft towards the center portion 211 of the object 204 is not increased and remains similar to that of without the vacuum chamber. As shown in FIG. 2, a microcontroller 218 is coupled to the shaft 201. In at least some embodiments, the microcontroller 218 is configured to adjust the size of an opened (or closed) portion of the window 222 to adjust the flow of the heat 202. As shown in FIG. 2, a thermometer 221 including a display is placed on the top portion 209 of the shaft 201. The thermometer 221 is coupled to the microcontroller 218 to measure and display the temperature in the central portion 211 of the object 204 on the display. In at least some embodiments, the thermometer is a digital thermometer, an analog thermometer or a combination thereof.

In at least some embodiments, microcontroller 218 is configured to determine if the flow of the heat needs to be adjusted based on the measured temperature. The microcontroller 218 is configured to adjust the flow of the heat 202 that is output through the at least one opening of the shaft 201, if it is determined that the heat needs to be adjusted. The microcontroller is configured to continue to measure the temperature of the object using the thermometer, if the flow of the heat does not need to be adjusted.

In at least some embodiments, the microcontroller 218 is configured to increase the flow of the heat that is output through the at least one opening of the shaft by opening at least a portion of the window 222, if the measured temperature is less than a predetermined threshold. In at least some embodiments, the microcontroller 218 is configured to decrease the flow of the heat that is output through the at least one opening of the shaft by closing at least a portion of the window 222 if the measured temperature is greater or equal to a predetermined threshold.

As shown in FIG. 2, the device to enhance cooking includes a removable fixture 208 coupled to vacuum chamber 217 at the end 205. The removable fixture 208 comprises a tip portion 212 that is inserted into the object 204 and a fitting portion 213 to fit into the end 205. In at least some embodiments, the tip portion 212 has a conic shape with a sharp tip point which is pushed into the object 204, but the shape is not limited thereto. In at least some embodiments, the removable fixture 208 has an opening 215 through which at least a portion 216 of the heat 202 is output into the center portion 211 of the object 204, so that the cooking speed of the object is increased and the cooking time of the object is decreased. In at least some embodiment, the material of the removable fixture 108 is similar to that of the removable fixture 108. As shown in FIG. 2, the device to enhance cooking includes a top portion 209 attached to the end 203 to push at least a portion of the shaft 201 into the object 204. In at least some embodiments, the top portion 209 represents top portion 109.

Figure 6:
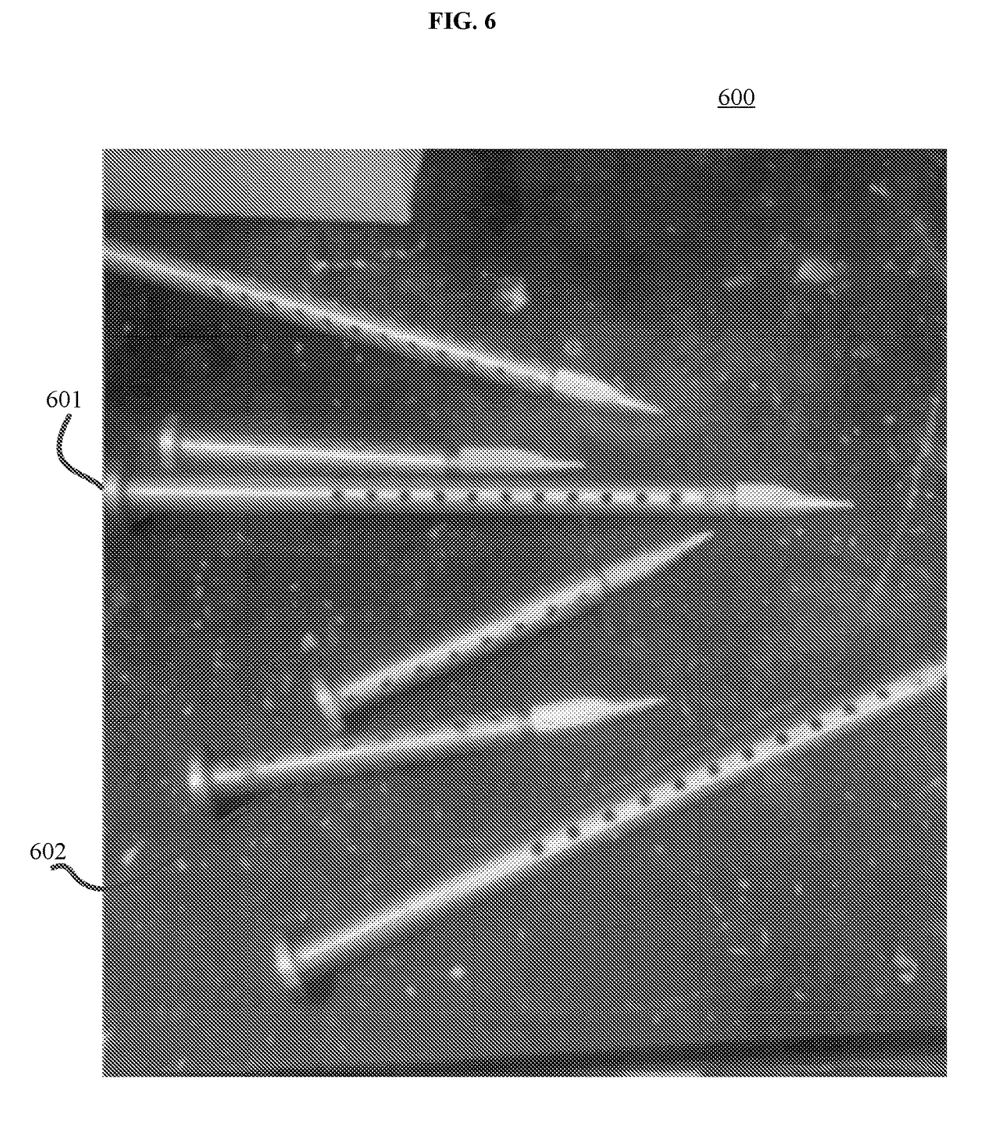
FIG. 6 is a view showing devices to enhance cooking having different sizes and different numbers of openings for various applications according to one embodiment.

FIG. 6 is a view 600 showing devices to enhance cooking having different sizes and different numbers of openings for various applications according to one embodiment. As shown in FIG. 6, the devices to enhance cooking such as a device 601 and a device 602 are small handheld devices. As shown in FIG. 6, the device 601 has a length greater than that of the device 602. As shown in FIG. 6, the device 601 has more openings than the device 602. In one embodiment, the device 601 enables cooking an object faster than the device 602. In one embodiment, a plurality of devices, such as devices 601 and 602 are inserted into a plurality of areas of the object to increase the flow of the heat and decrease the cooking time.

Figure 7:
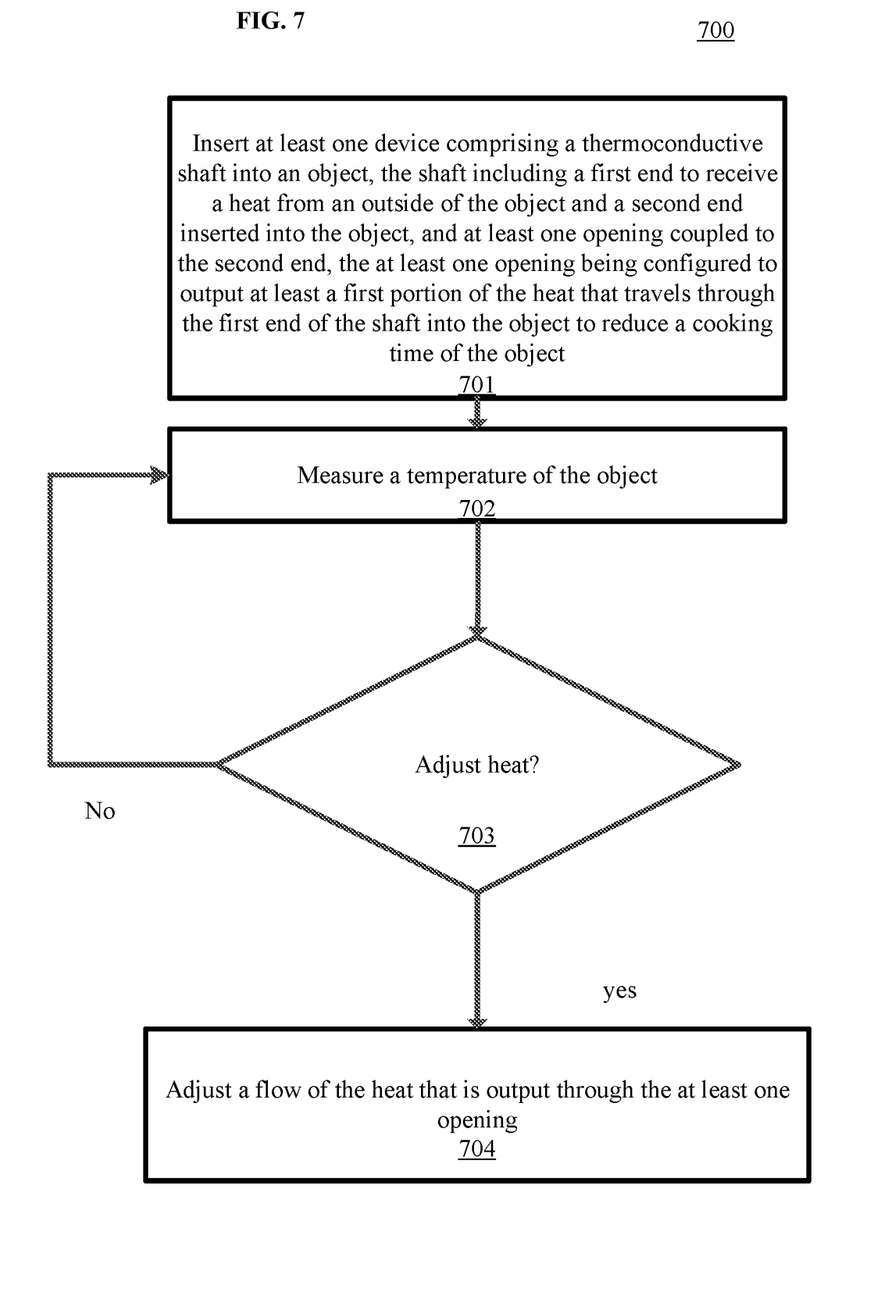
FIG. 7 shows a flowchart of a method to enhance cooking according to one embodiment.

FIG. 7 shows a flowchart of a method 700 to enhance cooking according to one embodiment. Method 700 starts with operation 701 that involves inserting at least one device comprising a shaft into an object. The shaft including a first end to receive a heat and a second end inserted into an object, and at least one opening coupled to the second end. The at least one opening is configured to output at least a portion of the heat that travels through the first end of the shaft into the object to reduce a cooking time of the object, as described above. In at least some embodiments, the at least one opening is located between the first end and the second end of the shaft, as described above. In at least some embodiments, a removable fixture is coupled to the second end of the shaft, as described above. At operation 702 a temperature at a central portion of the object is measured using a thermometer coupled to the shaft, as described above. At operation 703 it is determined if the flow of the heat needs to be adjusted based on the measured temperature. If yes, the flow of the heat that is output through the at least one opening of the shaft of the device is adjusted at operation 704. In at least some embodiments, the flow of the heat is adjusted by adjusting the size of the window to the vacuum chamber, as described above. In at least some other embodiments, a flow of the heat is adjusted by changing an amount of the devices that are inserted into the object, as described above. In at least some other embodiments, a flow of the heat that is output through the at least one opening is adjusted by adjusting the at least one device. In at least some embodiment, a flow of the heat that is output through the at least one opening is adjusted by moving the at least device in or out of the object to adjust a number of the openings that are inserted into the object and through which the heat from the shaft is escaped.

If the flow of the heat does not need to be adjusted, the method 700 returns to operation 702. In at least some embodiments, if the measured temperature is less than a predetermined threshold, the flow of the heat that is output through the at least one opening of the shaft is increased by opening the window of the vacuum chamber coupled to the shaft, as described above. In at least some embodiments, if the measured temperature is greater or equal to a predetermined threshold, the flow of the heat that is output through the at least one opening of the shaft is decreased by closing the window of the vacuum chamber coupled to the shaft, as described above.

In at least some embodiments, if the measured temperature is less than a predetermined threshold, the flow of the heat that is output through the at least one opening of the shaft is increased by increasing the number of the devices, such as devices 601 and 602 that are inserted to the object, as described above. In at least some embodiments, if the measured temperature is greater or equal to a predetermined threshold, the flow of the heat that is output through the at least one opening of the shaft is decreased by decreasing the number of the devices, such as devices 601 and 602 that are inserted into the object, as described above.

In the foregoing specification, embodiments of the application have been described with reference to specific exemplary embodiments thereof. It will be evident that various modifications may be made thereto without departing from the broader spirit and scope of embodiments of the application as set forth in the following claims. The specification and drawings are, accordingly, to be regarded in an illustrative sense rather than a restrictive sense.

What is claimed is:

1. A device to enhance cooking comprising:
   a shaft including a first end to receive a heat and a second end to be inserted into an object, and at least one opening coupled to the second end, the at least one opening being adapted to output at least a first portion of the heat into the object to reduce a cooking time of the object and a vacuum chamber coupled to the shaft.
2. The device of claim 1, wherein the at least one opening is between the first end and the second end.
3. The device of claim 1, further comprising:
   a removable fixture coupled to the second end.
4. The device of claim 1, further comprising:
   a top portion coupled to the first end to push at least a portion of the shaft into the object.
5. The device of claim 1, further comprising:
   a microcontroller coupled to the shaft.
6. The device of claim 1, further comprising:
   a thermometer coupled to the shaft.
7. The device of claim 1, wherein the shaft is a thermoconductive shaft.
8. A device to reduce a cooking time comprising:
   a shaft including a first end to receive a heat and a second end to be inserted into an object, and at least one opening between the first end and the second end, the at least one opening being adapted to output at least a first portion of the heat that travels through the first end into the object to reduce a cooking time of the object;
   a removable fixture coupled to the second end to be inserted into the object and a vacuum chamber between the first end and the second end.
9. The device of claim 8, wherein the removable fixture comprises a tip portion to be inserted into the object and a fitting portion to fit into the second end.
10. The device of claim 8, wherein the removable fixture comprises an opening to output at least a second portion of the heat.
11. The device of claim 8, further comprising:
    a top portion coupled to the first end to push at least a portion of the shaft into the object.
12. The device of claim 8, further comprising:
    a microcontroller coupled to the shaft.
13. The device of claim 8, further comprising:
    a thermometer coupled to the shaft.
14. A method to enhance cooking comprising:
    inserting at least one device comprising a shaft into an object, the shaft including a first end to receive a heat and a second end inserted into an object, and at least one opening coupled to the second end, the at least one opening being adapted to output at least a first portion of the heat that travels through the first end into the object to reduce a cooking time of the object wherein the at least one device comprises a vacuum chamber coupled to the shaft.
15. The method of claim 14, wherein the at least one opening is between the first end and the second end.
16. The method of claim 14, wherein the at least one device comprises a removable fixture coupled to the second end.
17. The method of claim 14, further comprising:
    adjusting a flow of the heat that is output through the at least one opening.
18. The method of claim 14, further comprising:
    measuring a temperature of the object using a thermometer coupled to the shaft.

* * * * *